US011966398B2

(12) United States Patent
Wu et al.

(10) Patent No.: US 11,966,398 B2
(45) Date of Patent: Apr. 23, 2024

(54) VIDEO DATA STORAGE METHOD, APPARATUS, TERMINAL DEVICE AND STORAGE MEDIUM

(71) Applicant: ZHEJIANG UNIVIEW TECHNOLOGIES CO., LTD., Zhejiang (CN)

(72) Inventors: Zuohua Wu, Zhejiang (CN); Qiang Ding, Zhejiang (CN)

(73) Assignee: ZHEJIANG UNIVIEW TECHNOLOGIES CO., LTD., Zhejiang (CN)

(*) Notice: Subject to any disclaimer, the term of this patent is extended or adjusted under 35 U.S.C. 154(b) by 200 days.

(21) Appl. No.: 17/609,694

(22) PCT Filed: Oct. 11, 2019

(86) PCT No.: PCT/CN2019/110636
§ 371 (c)(1),
(2) Date: Nov. 8, 2021

(87) PCT Pub. No.: WO2020/224184
PCT Pub. Date: Nov. 12, 2020

(65) Prior Publication Data
US 2022/0222257 A1    Jul. 14, 2022

(30) Foreign Application Priority Data

May 9, 2019   (CN) .......................... 201910382809.8

(51) Int. Cl.
G06F 16/2455    (2019.01)
G06F 3/06       (2006.01)
G06F 16/71      (2019.01)
(52) U.S. Cl.
CPC .......... *G06F 16/24552* (2019.01); *G06F 3/06* (2013.01); *G06F 16/71* (2019.01)

(58) Field of Classification Search
None
See application file for complete search history.

(56) References Cited

U.S. PATENT DOCUMENTS

2011/0022801 A1    1/2011  Flynn
2014/0215156 A1*   7/2014  Park ................... G06F 12/0888
                                                        711/119

(Continued)

FOREIGN PATENT DOCUMENTS

CN        101359460 A       2/2009
CN        101720033 A       6/2010

(Continued)

OTHER PUBLICATIONS

Extended European Search Report for Application No. 19928031.4, dated Apr. 19, 2023, 9 pages.

(Continued)

*Primary Examiner* — Richard L Bowen
(74) *Attorney, Agent, or Firm* — Morgan, Lewis & Bockius LLP

(57) ABSTRACT

A method for storing video data includes, when receiving the I-frame data to be stored, detecting whether the written data exists in the video cache space; when detecting that the written data exists in the video cache space, reading a target writing position of the I-frame data to be stored and determining whether the target writing position is located within a position range corresponding to the written data in the first cache space; when determining the target writing position is located within the position range, writing, based on the target writing position, the I-frame data to be stored to the first cache space for caching and detecting whether the first cache space is full; and when detecting that the first cache space is full, writing all the video data in the video cache (Continued)

space to a memory space of the terminal device for storage and emptying the video cache space.

16 Claims, 3 Drawing Sheets

(56) References Cited

U.S. PATENT DOCUMENTS

| | | | |
|---|---|---|---|
| 2016/0378656 A1* | 12/2016 | Kudo | G06F 12/0815 |
| | | | 711/143 |
| 2018/0063548 A1* | 3/2018 | Namjoshi | H04N 19/105 |
| 2018/0307611 A1 | 10/2018 | Horn | |
| 2020/0382846 A1* | 12/2020 | Zhou | H04N 21/44004 |

FOREIGN PATENT DOCUMENTS

| | | |
|---|---|---|
| CN | 107229620 A | 10/2017 |
| CN | 109597568 A | 4/2019 |

OTHER PUBLICATIONS

International Search Report for Application No. PCT/CN2019/110636, dated Feb. 1, 2020, 4 pages including English translation.

* cited by examiner

VIDEO DATA STORAGE METHOD, APPARATUS, TERMINAL DEVICE AND STORAGE MEDIUM

CROSS-REFERENCE TO RELATED APPLICATIONS

This is a National Stage Application filed under 35 U.S.C. 371 based on International Patent Application No. PCT/CN2019/110636, filed on Oct. 11, 2019, which claims priority to Chinese Patent Application No. 201910382809.8 filed on May 9, 2019, the disclosures of both of which are incorporated herein by reference in their entireties.

TECHNICAL FIELD

The present application relates to the technical field of video data block storage, for example, a method and apparatus for storing video data, a terminal device, and a storage medium.

BACKGROUND

With the continuous development of network technology, the mode of block storage is commonly used for implementing data storage in various industries (for example, the video monitoring industry and the network communication industry). However, excessively frequent small-block storage may cause the fragmentation of the memory space of a data storage device, thus deteriorating the storage performance of the data storage device. Accordingly, for most data storage devices, a cache space with a fixed capacity is added to the memory space. The data that needs to be written into the memory space is cached by using the cache space for transferring and caching. In this case, when certain conditions are met, the data cached in the cache space is written into the memory space for storage. Thus, the times of memory writing are reduced and the storage performance of the device is improved.

For most data storage devices, data can only be written into the cache space for caching sequentially. When a data storage device is used for storing video data, after completing a caching operation of the non-sequentially written video data each time (for example, performing data write-back for the frame-group head in the I-frame-group video data that has been cached in the cache space), the data storage device may directly write the cached video data into the memory space in advance in the case where the cache space is not full. Accordingly, the cache space cannot be fully utilized, resulting in that the storage performance of the data storage device fails to reach a relatively sound state.

SUMMARY

This present application provides a method and apparatus for storing video data, a terminal device, and a storage medium so as to implement caching operation on the non-sequentially written I-frame-group video data and fully utilize the space capacity of the video cache space. Thus, memory writing times are decreased and the data writing amount of each memory writing operation is increased so that the storage performance of the terminal device reaches a relatively sound state.

The embodiments of the present application provide a method for storing video data. The method is applied to a terminal device including a video cache space. The video cache space includes a first cache space and a second cache space. The writing priority of the first cache space is higher than the writing priority of the second cache space. Moreover, at least one piece of the I-frame-group video data is able to be written into each of the first cache space and the second cache space. The method includes the steps below.

In the case of receiving the I-frame data to be stored that is included in the I-frame-group video data to be stored, it is detected whether the written data exists in the video cache space.

In the case of detecting that the written data exists in the video cache space, a target writing position of the I-frame data to be stored is read and it is determined whether the target writing position is located within a position range corresponding to the written data in the first cache space.

In response to a determination result that the target writing position is located within the position range, based on the target writing position, the I-frame data to be stored is written to the first cache space for caching; and it is detected whether the first cache space is full.

In the case of detecting that the first cache space is full, all the video data in the video cache space is written to a memory space of the terminal device for storage and the video cache space is emptied.

The embodiments of the present application provide an apparatus for storing video data. The apparatus is applied to a terminal device including a video cache space. The video cache space includes a first cache space and a second cache space. The writing priority of the first cache space is higher than the writing priority of the second cache space. Moreover, at least one piece of the I-frame-group video data is able to be written into each of the first cache space and the second cache space. The apparatus includes a written detection module, a position determination module, a cache writing module, and a memory writing module.

The written detection module is configured to, in the case of receiving the I-frame data to be stored that is included in the I-frame-group video data to be stored, detect whether the written data exists in the video cache space.

The position determination module is configured to, in the case of detecting that the written data exists in the video cache space, read a target writing position of the I-frame data to be stored and determine whether the target writing position is located within a position range corresponding to the written data in the first cache space.

The cache writing module is configured to, in response to a determination result that the target writing position is located within the position range, write, based on the target writing position, the I-frame data to be stored to the first cache space for caching and detect whether the first cache space is full.

The memory writing module is configured to, in the case of detecting that the first cache space is full, write all the video data in the video cache space to a memory space of the terminal device for storage and empty the video cache space.

The embodiments of the present application provide a terminal device. The terminal device includes a processor and a memory. The memory is configured to store a computer program. When the computer program is executed by the processor, the method of any embodiment of the present application is performed.

The embodiments of the present application provide a non-transitory computer-readable storage medium configured to store a computer program. When the computer program is executed by the processor, the preceding method is performed.

Figure 1:
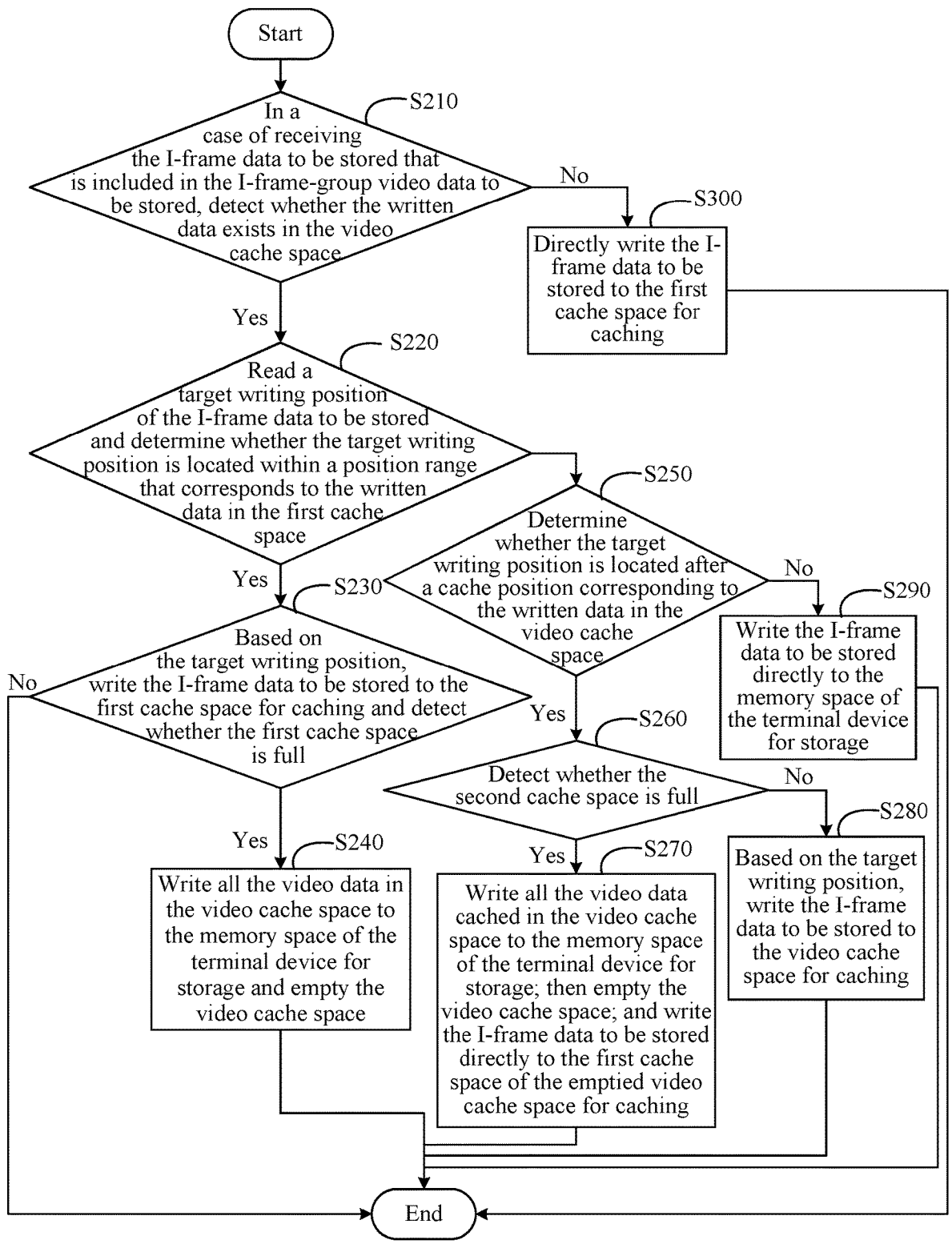
FIG. 1 is a flowchart of a method for storing video data according to an embodiment of the present application.

REFERENCE LIST 100 apparatus for storing video data
110 written detection module
120 position determination module
130 cache writing module
140 memory writing module
150 counting and calculation module
160 capacity configuration module
210 processor
220 memory

DETAILED DESCRIPTION

Technical solutions in the embodiments of the present application will be described in conjunction with drawings in the embodiments of the present application. The embodiments described herein are part, not all, of the embodiments of the present application. Components of the embodiments of the present application described and illustrated in the drawings herein may be arranged and designed through various configurations.

Therefore, the description of the embodiments of the present application shown in the drawings herein is not intended to limit the scope of the present application, but merely illustrates the selected embodiments of the present application. Similar reference numerals and letters indicate similar items in the drawings, and therefore, once an item is defined in one drawing, the item needs no definition and explanation in subsequent drawings.

In the description of the present disclosure, the terms including "first", "second", and "third" are only configured to distinguish the description, and are not to be construed as indicating or implying relative importance.

Some embodiments of the present application will be described hereinafter in conjunction with the drawings. Referring to FIG. 1, FIG. 1 is a flowchart of a method for storing video data according to an embodiment of the present application. In the embodiments of the present application, the method for storing video data is applied to a terminal device including a video cache space. Based on the video cache space, the terminal device performs caching operation on the non-sequentially written I-frame-group video data and fully utilizes the space capacity of the video cache space. Thus overall memory writing times are decreased and the data writing amount of each memory writing operation is increased so that the storage performance of the terminal device reaches a relatively sound state. In this embodiment, the terminal device includes at least one random access memory (RAM) and at least one read only memory (ROM). The terminal device constructs the video cache space for transferring and caching the I-frame-group video data through the at least one RAM. The terminal device constructs a corresponding memory space for storing the I-frame-group video data through the at least one ROM. In this embodiment, the terminal device may be, but is not limited to, a personal computer (PC), a server, a tablet, a personal digital assistant (PDA), and a mobile Internet device (MID).

In this embodiment, the video cache space includes a first cache space and a second cache space. The writing priority of the first cache space is higher than the writing priority of the second cache space. Moreover, the average data amount of at least one piece of the I-frame-group video data is able to be written into each of the first cache space and the second cache space. The average data amount of the I-frame-group video data is the average value of data amounts of multiple pieces of I-frame-group video data received by the terminal device in a period. The space capacity of the first cache space may be different from the space capacity of the second cache space. When writing the video data to the video cache space for caching, the terminal device gives priority to writing the video data to the first cache space. Moreover, after determining that the first cache space is full, the terminal device writes the corresponding video data to the second cache space. The processes and steps of the method for storing video data illustrated in FIG. 1 are described hereinafter.

In step S210, in the case of receiving the I-frame data to be stored that is included in the I-frame-group video data to be stored, it is detected whether the written data exists in the video cache space.

In this embodiment, in the case of receiving any I-frame data to be stored that is included in one piece of I-frame-group video data to be stored, the terminal device correspondingly detects whether the written data exists in the video cache space. In one embodiment, the data capacity that corresponds to one piece of I-frame data to be stored is equal to the data capacity of one cache unit in the video cache space. By directly detecting whether the written data exists in the first cache space, the terminal device detects whether the written data exists in the video cache space. In the case of detecting that the written data exists in the video cache space, the terminal device performs step S220 correspondingly; in the case of detecting that no written data exist in the video cache space, the terminal device performs step S300 correspondingly. In one implementation of this embodiment, the data capacity of one cache unit in the video cache space is 64 KB.

In step S220, a target writing position of the I-frame data to be stored is read and it is determined whether the target writing position is located within a position range that corresponds to the written data in the first cache space.

In this embodiment, in the case of detecting that the written data exists in the video cache space, the terminal device correspondingly reads the target writing position of the I-frame data to be stored in the video cache space. Accordingly, based on the target writing position, the terminal device determines whether the I-frame data to be stored is the write-back content corresponding to the frame-group head in the I-frame-group video data to be stored. In this embodiment, in the case of determining that the target writing position of the I-frame data to be stored is located within the position range corresponding to the written data in the first cache space, the terminal device determines that the I-frame data to be stored is the write-back content in the I-frame-group video data to be stored; correspondingly, the terminal device performs step S230. In the case of determining that the target writing position of the I-frame data to be stored is not located within the position range corresponding to the written data in the first cache space, the terminal device determines that the I-frame data to be stored is not the write-back content; correspondingly, the terminal device performs step S250.

In step S230, based on the target writing position, the I-frame data to be stored is written to the first cache space for caching and it is detected whether the first cache space is full.

In this embodiment, in the case of determining that the target writing position of the I-frame data to be stored is located within the position range corresponding to the written data in the first cache space, the terminal device directly uses the I-frame data to be stored to overwrite the written data that corresponds to the position range and is in the first cache space so that the I-frame data to be stored is cached in the first cache space. Accordingly, the caching process of the I-frame-group video data to be stored corresponding to the I-frame data to be stored is completed. Then the terminal device detects whether the first cache space is full so as to determine whether the video data cached in each of the first cache space and the second cache space is written to the memory space of the terminal device for storage.

In one implementation of this embodiment, the step of detecting whether the first cache space is full includes the following steps: the data amount of the video data cached in each of the first cache space and the second cache space is counted, and the total size of the video data cached in the video cache space is calculated; the total size of the video data is compared with the space capacity of the first cache space; in the case of the total size of the video data not smaller than the space capacity of the first cache space, it is determined that the first cache space is full; and in the case of the total size of the video data smaller than the space capacity of the first cache space, it is determined that the first cache space is not full.

In another implementation of this embodiment, the step of detecting whether the first cache space is full includes the following steps: the data amount of the video data cached in the first cache space is counted; the counted data amount is compared with the space capacity of the first cache space; in the case of the data amount smaller than the space capacity of the first cache space, it is determined that the first cache space is not full; in the case of the data amount equal to the space capacity of the first cache space, it is determined that the first cache space is full.

In this embodiment, in the case of detecting that the first cache space is full, the terminal device directly determines that the next piece of I-frame-group video data to be stored fails to be cached in the video cache space. In this case, the terminal device performs step S240 correspondingly. In the case of detecting that the first cache space is not full, the terminal device may cache the next piece of I-frame-group video data to be stored based on the remaining space capacity of the first cache space. For example, in the case of receiving the I-frame data corresponding to the frame-group head of the next piece of I-frame-group video data to be stored, the terminal device may cache the I-frame data corresponding to the frame-group head with the remaining space capacity of the first cache space.

In step S240, all the video data in the video cache space is written to the memory space of the terminal device for storage and the video cache space is emptied.

In this embodiment, in the case of completing the data writing-back process of the I-frame data and detecting that the first cache space is full, the terminal device directly writes all the video data currently cached in each of the first cache space and second cache space of the video cache space to the memory space of the terminal device for storage.

Moreover, the terminal device empties the video cache space so that the emptied cache space is used for caching the next piece of I-frame-group video data to be stored.

In this embodiment, through performing the preceding steps S210 to S240 included in the manner of video data storage, the terminal device performs caching operation on the non-sequentially written I-frame-group video data and fully utilizes the space capacity of the video cache space. Thus overall memory writing times are decreased and the data writing amount of each memory writing operation is increased so that the storage performance of the terminal device reaches a relatively sound state.

Referring to FIG. 1 again, the method for storing video data further includes the steps below.

In step S250, it is determined whether the target writing position is located after a cache position corresponding to the written data in the video cache space.

In this embodiment, in the case of determining that the target writing position of the I-frame data to be stored is not located within the position range corresponding to the written data in the first cache space, the terminal device determines whether the target writing position of the I-frame data to be stored is located after the cache position corresponding to the written data in the video cache space. In the case of determining that the target writing position is located after the cache position, the terminal device determines that the I-frame data to be stored is the data in the middle or at the end of the frame group in the I-frame-group video data to be stored. In this case, the terminal device performs step S260 correspondingly. In the case of determining that the target writing position is not located after the cache position corresponding to the written data in the video cache space (for example, the target writing position is located before the video cache space or exceeds the video cache space), the terminal device determines that the I-frame data to be stored is abnormal video data. In this case, the terminal device performs step S290.

In step S260, it is detected whether the second cache space is full.

In this embodiment, in the case of determining that the target writing position of the I-frame data to be stored is not located in the position range corresponding to the written data in the first cache space but is located after the cache position corresponding to the written data in the video cache space, the terminal device detects whether the second cache space is full so as to determine whether the I-frame data to be stored can be written to the video cache space for caching.

In an implementation of this embodiment, the step of detecting whether the second cache space is full includes the following steps: the data amount of the video data cached in each of the first cache space and the second cache space is counted, and the total size of the video data cached in the video cache space is calculated; the total size of the video data is added to the data amount of the I-frame data to be stored, and the total data amount acquired by adding is compared with the total space capacity of the video cache space; in the case of the total data amount not smaller than the total space capacity, it is determined that the second cache space is full; in the case of the total data amount smaller than the total space capacity, it is determined that the second cache space is not full.

In another implementation of this embodiment, the step of detecting whether the second cache space is full includes the following steps: the data amount of the video data cached in the second cache space is counted; the counted data amount is compared with the space capacity of the second cache space; in the case of the data amount smaller than the space capacity of the second cache space, it is determined that the second cache space is not full; in the case of the data amount equal to the space capacity of the second cache space, it is determined that the second cache space is full.

In this embodiment, in the case of determining that the target writing position of the I-frame data to be stored is located after the cache position corresponding to the written data in the video cache space and that the second cache space is not full, the terminal device directly caches the I-frame data to be stored with the currently remaining space capacity of the video cache space. In this case, the terminal device performs step S280 correspondingly. In the case of determining that the target writing position of the I-frame data to be stored is located after the cache position corresponding to the written data in the video cache space and determining that the second cache space is full, the terminal device directly determines that the I-frame data to be stored fails to be cached in the video cache space currently. In this case, the terminal device performs step S270 correspondingly.

In step S270, all the video data cached in the video cache space is written to the memory space of the terminal device for storage; then the video cache space is emptied; and the I-frame data to be stored is directly written to the first cache space of the emptied video cache space for caching.

In this embodiment, in the case of determining that the I-frame data to be stored fails to be cached in the video cache space currently, the terminal device writes all the video data cached in the video cache space to the memory space of the terminal device for storage, then empties the video cache space, and writes the current I-frame data to be stored to the first cache space of the emptied video cache space for storage. In this case, the terminal device caches the remaining I-frame data to be stored among the current I-frame-group video data to be stored with the current video cache space.

In step S280, based on the target writing position, the I-frame data to be stored is written to the video cache space for caching.

In this embodiment, in the case of determining that the I-frame data to be stored may still be cached in the video cache space, the terminal device directly writes the I-frame data to be stored to a position that corresponds to the target writing position and is in the video cache space for caching. In this embodiment, in the case where the first cache space is not full, the terminal device directly writes the I-frame data to be stored to the position that corresponds to the target writing position and is in the first cache space. In the case where the first cache space is full, the terminal device directly writes the I-frame data to be stored to the position that corresponds to the target writing position and is in the second cache space.

Referring to FIG. 1 again, the method for storing video data further includes the step below.

In step S290, the I-frame data to be stored is directly written to the memory space of the terminal device for storage.

In this embodiment, in the case of determining that the target writing position is not located after the cache position corresponding to the written data in the video cache space, the terminal device determines that the I-frame data to be stored is abnormal video data. In this case, the terminal device writes the I-frame data to be stored to the memory space of the terminal device for storage. In one embodiment, in the case where the I-frame data to be stored is the write-back content corresponding to the frame-group head in the current I-frame-group video data to be stored, the terminal device directly uses the I-frame data to be stored to overwrite the frame-group head data in the I-frame-group video data to be stored that is written to the memory space.

Referring to FIG. 1 again, the method for storing video data further includes the step below.

In step S300, the I-frame data to be stored is directly written to the first cache space for caching.

In this embodiment, in the case where the terminal device has performed step S210 and determines that no written data exists in the video cache space, the first cache space also has no written data. In this case, the terminal device determines that the I-frame data to be stored is the frame-group head data that is to be overwritten and is in the I-frame-group video data to be stored. Moreover, the terminal device writes the I-frame data to be stored to the first cache space for caching so as to cache the remaining video data to be stored among the current I-frame-group video data to be stored with the remaining space capacity of the video cache space.

Figure 2:
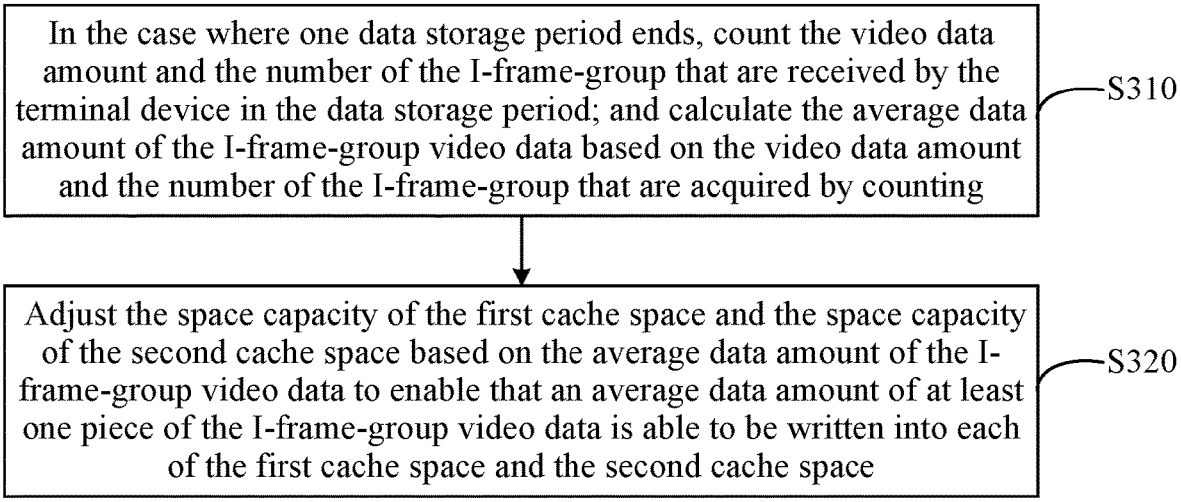
FIG. 2 is a flowchart of another method for storing video data according to an embodiment of the present application.

Referring to FIG. 2, FIG. 2 is a flowchart of another method for storing video data according to an embodiment of the present application. In embodiments of the present application, the method for storing video data further includes the steps below.

In step S310, in the case where one data storage period ends, the video data amount and the number of the I-frame-group that are received by the terminal device in the data storage period are counted; and the average data amount of the I-frame-group video data is calculated based on the video data amount and the number of the I-frame-group that are acquired by counting.

In this embodiment, the data storage period is used for indicating that the terminal device needs to store the video data within a period corresponding to the data storage period. The data storage period may be 1 hour, 1.5 hours, or 3 hours. In the case where the working duration of the terminal device corresponding to each data storage period runs out, the terminal device correspondingly counts the video data amount and the number of the I-frame-group that are received by the terminal device in the data storage period. Moreover, the terminal device calculates the average data amount of the I-frame-group video data in the data storage period based on the video data amount and the number of the I-frame-group that are acquired by counting.

In step S320, the space capacity of the first cache space and the space capacity of the second cache space are adjusted based on the average data amount of the I-frame-group video data to enable that an average data amount of at least one piece of the I-frame-group video data is able to be written into each of the first cache space and the second cache space.

In this embodiment, in the case of calculating the average data amount corresponding to the I-frame-group video data each time, the terminal device compares the currently calculated average data amount of the I-frame-group video data with the average data amount of the I-frame-group video data that is calculated last time. When the currently calculated average data amount is equal to the average data amount calculated last time, the space capacity of the first cache space and the space capacity of the second cache space that are configured by the terminal device need no adjustment and remain in a state in which the average data amount of at least one piece of the I-frame-group video data can be written. In the case where the currently calculated average data amount is not equal to the average data amount calculated last time, the terminal device, based on the speed of receiving the video data amount in the data storage period by the terminal device, calculates a target space capacity of the first cache space and a target space capacity of the second cache space that need to be adjusted in place. Moreover, the terminal device dynamically adjusts the current space capacity of the first cache space and the current space capacity of the second cache space based on the acquired target space capacities.

In one implementation of this embodiment, the terminal device selects the maximum value between the minimum intrinsic cache capacity value and the capacity product value calculated based on the speed of receiving the video data amount and the intrinsic coefficient as the target space capacity of the first cache space. In one embodiment, the minimum intrinsic cache capacity is not smaller than the currently calculated average data amount of the I-frame-group video data. The intrinsic coefficient may be 5, 6, or 7.

In one implementation of this embodiment, the terminal device selects the capacity product value calculated based on the speed of receiving the video data amount and the cache extension coefficient as the target space capacity of the second cache space. In one embodiment, the cache extension coefficient may be 1.2, 2.5, or 3.

Figure 3:
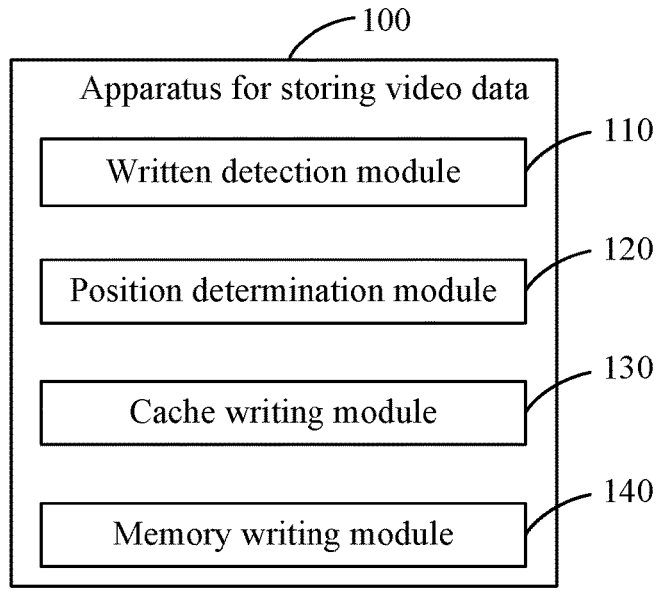
FIG. 3 is a block diagram of an apparatus for storing video data according to an embodiment of the present application.

Referring to FIG. 3, FIG. 3 is a block diagram of an apparatus for storing video data according to an embodiment of the present application. In embodiments of the present application, the apparatus 100 for storing video data is applied to a terminal device including a video cache space. In this embodiment, the video cache space includes a first cache space and a second cache space. The writing priority of the first cache space is higher than the writing priority of the second cache space. Moreover, at least one piece of the I-frame-group video data is able to be written into each of the first cache space and the second cache space. In this embodiment, the apparatus 100 for storing video data includes a written detection module 110, a position determination module 120, a cache writing module 130, and a memory writing module 140.

The written detection module 110 is configured to, in the case of receiving the I-frame data to be stored that is included in the I-frame-group video data to be stored, detect whether the written data exists in the video cache space.

In this embodiment, the written detection module 110 may perform step S210 shown in FIG. 1. The execution process may refer to the preceding description of step S210.

The position determination module 120 is configured to, in the case of detecting that the written data exists in the video cache space, read a target writing position of the I-frame data to be stored and determine whether the target writing position is located within a position range corresponding to the written data in the first cache space.

In this embodiment, the position determination module 120 may perform step S220 shown in FIG. 1. The execution process may refer to the preceding description of step S220.

The cache writing module 130 is configured to, in response to a determination result that the target writing position is located within the position range, write, based on the target writing position, the I-frame data to be stored to the first cache space for caching and detect whether the first cache space is full.

In this embodiment, the cache writing module 130 may perform step S230 shown in FIG. 1. The execution process may refer to the preceding description of step S230.

The memory writing module 140 is configured to, in the case of detecting that the first cache space is full, write all the video data in the video cache space to a memory space of the terminal device for storage and empty the video cache space.

In this embodiment, the memory writing module 140 may perform step S240 shown in FIG. 1. The execution process may refer to the preceding description of step S240.

The position determination module 120 is further configured to, in response to a determination result that the target writing position is not located within the position range, determine whether the target writing position is located after a cache position corresponding to the written data in the video cache space.

In this embodiment, the position determination module 120 may further perform step S250 shown in FIG. 1. The execution process may refer to the preceding description of step S250.

The cache writing module 130 is further configured to, in response to a determination result that the target writing position is located after the cache position, detect whether the second cache position is full and, in the case of detecting that the second cache space is not full, write, based on the target writing position, the I-frame data to be stored to the video cache space for caching.

In this embodiment, the cache writing module 130 may further perform steps S260 and S280 shown in FIG. 1. The execution process may refer to the preceding description of steps S260 and S280.

The memory writing module 140 is further configured to, in the case where the cache writing module 130 detects that the second cache space is full, all the video data cached in the video cache space is written to the memory space of the terminal device for storage and the video cache space is emptied to enable that the cache writing module 130 directly writes the I-frame data to be stored to the first cache space of the emptied video cache space for caching.

In this embodiment, the memory writing module 140 may further perform part of the content in step S270 in FIG. 1. The cache writing module 130 may further perform the remaining content of step S270 in FIG. 1. The execution process may refer to the preceding description of step S270.

The memory writing module 140 is further configured to, in response to the determination result that the target writing position is not located after the cache position, write the I-frame data to be stored to the memory space of the terminal device for storage.

In this embodiment, the memory writing module 140 may perform step S290 shown in FIG. 1. The execution process may refer to the preceding description of step S290.

The cache writing module 130 is further configured to, in the case of detecting that no written data exists in the video cache space, directly write the I-frame data to be stored to the first cache space for caching.

In this embodiment, the cache writing module 130 may further perform step S300 shown in FIG. 1. The execution process may refer to the preceding description of step S300.

Figure 4:
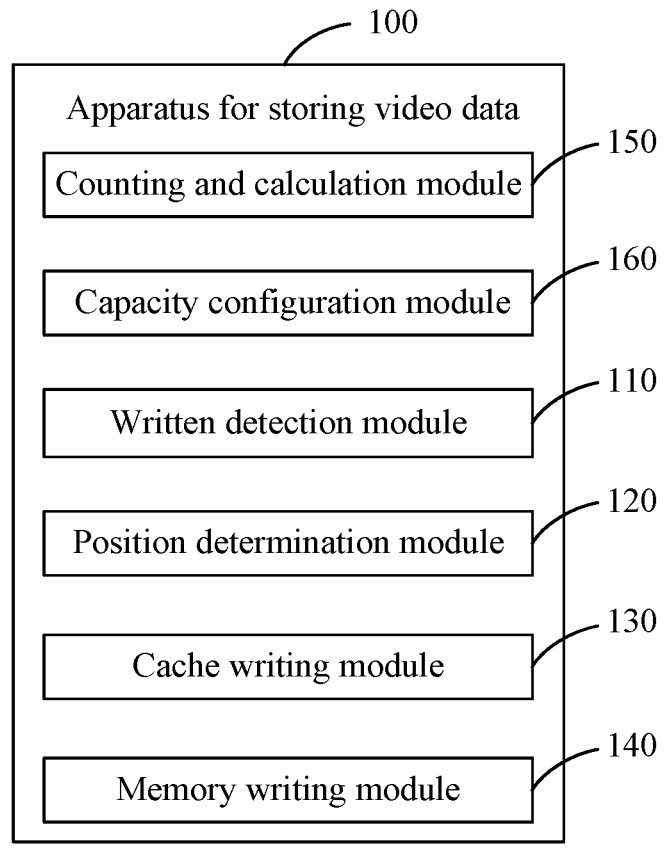
FIG. 4 is a block diagram of another apparatus for storing video data according to an embodiment of the present application.

Referring to FIG. 4, FIG. 4 is a block diagram of another apparatus for storing video data according to an embodiment of the present application. In embodiments of the present application, the apparatus 100 for storing video data may further include a counting and calculation module 150 and a capacity configuration module 160.

The counting and calculation module 150 is configured to, in the case where one data storage period ends, count the video data amount and the number of the I-frame-group that are received by the terminal device in the data storage period and calculate the average data amount of the I-frame-group video data based on the video data amount and the number of the I-frame-group that are acquired by counting.

In this embodiment, the counting and calculation module 150 may further perform step S310 shown in FIG. 2. The execution process may refer to the preceding description of step S310.

The capacity configuration module 160 is configured to adjust the space capacity of the first cache space and the space capacity of the second cache space based on the average data amount of the I-frame-group video data to enable that an average data amount of at least one piece of the I-frame-group video data is able to be written into each of the first cache space and the second cache space.

In this embodiment, the capacity configuration module 160 may further perform step S320 shown in FIG. 2. The execution process may refer to the preceding description of step S320.

In the method and apparatus for storing video data provided by the present application, as for the present application, in the case of receiving the I-frame data to be stored that is included in the I-frame-group video data to be stored, it is detected whether the written data exists in the video cache space. Moreover, in the case of detecting that the written data exists in the video cache space, it is determined whether the I-frame data to be stored is used for overwriting the written data in the first cache space of the video cache space so as to determine whether the I-frame data to be stored is the non-sequentially written video data. Then for the present application, in the case of determining that the I-frame data to be stored is used for overwriting the written data in the first cache space, the I-frame data to be stored is directly written to a corresponding position in the first cache space and it is detected whether the first cache space is full. Then for the present application, in the case where the first cache space is not full, the next I-frame-group video data to be stored is cached with the remaining space capacity of the first cache space. Moreover, in the case of determining that the first cache space is full, all the video data cached in each of the first cache space and second cache space of the video cache space is written to the memory space of the terminal device for storage; and the video cache space is emptied. In this case, the caching operation is performed on the non-sequentially written I-frame-group video data; and the space capacity of the video cache space is fully utilized. Thus the data writing amount of each memory writing operation is increased and overall memory writing times are decreased so that the storage performance of the terminal device reaches a relatively sound state.

Figure 5:
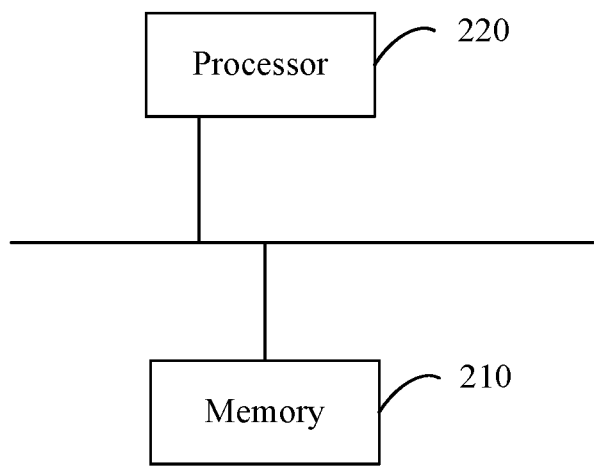
FIG. 5 is a diagram illustrating the structure of a terminal device according to an embodiment of the present application.

FIG. 5 is a diagram illustrating the structure of a terminal device according to an embodiment of the present application. As shown in FIG. 5, the terminal device includes a processor 210 and a memory 220. The number of processors 50 in a financial self-service device may be one or more. FIG. 5 illustrates an example in which one processor 210 is provided. The processor 210 and the memory 220 that are in the terminal device may be connected through a bus or in other manners. FIG. 5 illustrates an example of the connection through a bus.

As a computer-readable storage medium, the memory 220 may be configured to store a software program, a computer-executable program, and a module, for example, a program instruction/module corresponding to an apparatus of video data storage in any preceding embodiment (for example, a written detection module 110, a position determination module 120, a cache writing module 130, and a memory writing module 140 that are in the apparatus of video data storage). The processor 210 executes the software program, instruction and module stored in the memory 220 to implement at least one functional application and data processing of the apparatus for storing video data, that is, to implement the operation of the preceding apparatus for storing video data.

The memory 220 may include a program storage region and a data storage region. The program storage region may store an operating system and an application program required by at least one function. The data storage region may store the data created according to the use of the apparatus for storing video data. Additionally, the memory 220 may include a high-speed random access memory and may also include a non-volatile memory, for example, at least one disk memory element, flash memory element, or another non-volatile solid-state memory element. In some examples, the memory 220 may include memories that are disposed remotely relative to the processor 210. These remote memories may be connected to a depositing apparatus through a network. Examples of the preceding network include, but are not limited to, the Internet, an intranet, a local area network, a mobile communication network, and a combination thereof.

This embodiment further provides a non-transitory computer-readable storage medium storing a computer program. When the computer program is executed by the processor, the method for storing video data provided in any preceding embodiment is performed.

What is claimed is:

1. A method for storing video data, applied to a terminal device comprising a video cache space, wherein the video cache space comprises a first cache space and a second cache space, a writing priority of the first cache space is higher than a writing priority of the second cache space, at least one piece of I-frame-group video data is able to be written into each of the first cache space and the second cache space, and the method comprises:

in a case of receiving I-frame data to be stored, detecting whether written data exists in the video cache space, wherein the I-frame data to be stored is comprised in I-frame-group video data to be stored;

in a case of detecting that the written data exists in the video cache space, reading a target writing position of the I-frame data to be stored and determining whether the target writing position is located within a position range corresponding to the written data in the first cache space;

in response to a determination result that the target writing position is located within the position range, determining that the I-frame data to be stored is write-back content in the I-frame-group video data to be stored, writing, based on the target writing position, the I-frame data to be stored to the first cache space for caching and detecting whether the first cache space is full; and in a case of detecting that the first cache space is full, writing all video data in the video cache space to a memory space of the terminal device for storage and emptying the video cache space, wherein the method further comprises:

in response to a determination result that the target writing position is not located within the position range, determining whether the target writing position is located after a cache position corresponding to the written data in the video cache space;

in response to a determination result that the target writing position is located after the cache position, determining that the I-frame data to be stored is data in the middle or at the end of a frame group in the I-frame-group video data to be stored, and detecting whether the second cache position is full; and in a case of detecting that the second cache space is not full, writing, based on the target writing position, the I-frame data to be stored to the video cache space for caching; and in a case of detecting that the second cache space is full, writing all the video data cached in the video cache space to the memory space of the terminal device for storage, emptying the video cache space, and writing the I-frame data to be stored to the first cache space of the emptied video cache space for caching.

2. The method of claim 1, wherein detecting whether the first cache space is full comprises:

counting a data amount of video data cached in the first cache space and a data amount of video data cached in the second cache space and calculating a total data amount of video data cached in the video cache space;

comparing the total data amount of the video data with a space capacity of the first cache space; and in a case where the total data amount of the video data is not smaller than the space capacity of the first cache space, determining that the first cache space is full; and in a case where the total data amount of the video data is smaller than the space capacity of the first cache space, determining that the first cache space is not full.

3. The method of claim 2, further comprising:

in response to a determination result that the target writing position is not located within the position range, determining whether the target writing position is located after a cache position corresponding to the written data in the video cache space;

in response to a determination result that the target writing position is located after the cache position, detecting whether the second cache position is full; and in a case of detecting that the second cache space is not full, writing, based on the target writing position, the I-frame data to be stored to the video cache space for caching; and in a case of detecting that the second cache space is full, writing all the video data cached in the video cache space to the memory space of the terminal device for storage, emptying the video cache space, and writing the I-frame data to be stored to the first cache space of the emptied video cache space for caching.

4. The method of claim 2, further comprising:

in a case of detecting that no written data exists in the video cache space, writing the I-frame data to be stored to the first cache space for caching.

5. The method of claim 2, further comprising:

in a case where one data storage period ends, counting a video data amount and a number of I-frame-group received by the terminal device in the one data storage period and calculating an average data amount of the I-frame-group video data based on the video data amount and the number of the I-frame-group acquired by counting; and adjusting the space capacity of the first cache space and the space capacity of the second cache space based on the average data amount of the I-frame-group video data to enable that an average data amount of at least one piece of the I-frame-group video data is able to be written into each of the first cache space and the second cache space.

6. The method of claim 1, further comprising:

in response to a determination result that the target writing position is not located after the position range, writing the I-frame data to be stored to the memory space of the terminal device for storage.

7. The method of claim 6, further comprising:

in a case of detecting that no written data exists in the video cache space, writing the I-frame data to be stored to the first cache space for caching.

8. The method of claim 1, further comprising:

in a case of detecting that no written data exists in the video cache space, writing the I-frame data to be stored to the first cache space for caching.

9. The method of claim 1, further comprising:

in a case where one data storage period ends, counting a video data amount and a number of I-frame-group received by the terminal device in the one data storage period and calculating an average data amount of the I-frame-group video data based on the video data amount and the number of the I-frame-group acquired by counting; and adjusting the space capacity of the first cache space and the space capacity of the second cache space based on the average data amount of the I-frame-group video data to enable that an average data amount of at least one piece of the I-frame-group video data is able to be written into each of the first cache space and the second cache space.

10. The method of claim 1, further comprising:

in a case of detecting that no written data exists in the video cache space, writing the I-frame data to be stored to the first cache space for caching.

11. An apparatus for storing video data applied to a terminal device comprising a video cache space, wherein the video cache space comprises a first cache space and a second cache space, a writing priority of the first cache space is higher than a writing priority of the second cache space, at least one piece of I-frame-group video data is able to be written into each of the first cache space and the second cache space, and the apparatus comprises:

a processor and a memory storing processor-executable instructions, wherein the processor-executable instructions, when executed by the processor, are configured to:

in a case of receiving I-frame data to be stored, detect whether written data exists in the video cache space, wherein the I-frame data to be stored is comprised in the I-frame-group video data to be stored;

in a case of detecting that the written data exists in the video cache space, read a target writing position of the I-frame data to be stored and determine whether the target writing position is located within a position range corresponding to the written data in the first cache space;

in response to a determination result that the target writing position is located within the position range, determine that the I-frame data to be stored is write-back content in the I-frame-group video data to be stored, write, based on the target writing position, the I-frame data to be stored to the first cache space for caching and detect whether the first cache space is full; and in a case of detecting that the first cache space is full, write all video data in the video cache space to a memory space of the terminal device for storage and empty the video cache space;

wherein the processor-executable instructions, when executed by the processor, are further configured to:

in response to a determination result that the target writing position is not located within the position range, determine whether the target writing position is located after a cache position corresponding to the written data in the video cache space;

in response to a determination result that the target writing position is located after the cache position, determine that the I-frame data to be stored is data in the middle or at the end of a frame group in the I-frame-group video data to be stored, and detecting whether the second cache position is full; and in a case of detecting that the second cache space is not full, write, based on the target writing position, the I-frame data to be stored to the video cache space for caching; and in a case of detecting that the second cache space is full, write all the video data cached in the video cache space to the memory space of the terminal device for storage, empty the video cache space, and write the I-frame data to be stored to the first cache space of the emptied video cache space for caching.

12. The apparatus of claim 11, wherein the processor-executable instructions, when executed by the processor, are further configured to, in a case of detecting that no written data exists in the video cache space, write the I-frame data to be stored to the first cache space for caching.

13. The apparatus of claim 12, wherein the processor-executable instructions, when executed by the processor, are further configured to:

in a case where one data storage period ends, count a video data amount and a number of I-frame-group received by the terminal device in the data storage period and calculate an average data amount of the I-frame-group video data based on the video data amount and the number of the I-frame-group acquired by counting; and adjust a space capacity of the first cache space and a space capacity of the second cache space based on the average data amount of the I-frame-group video data to enable that an average data amount of at least one piece of the I-frame-group video data is able to be written into each of the first cache space and the second cache space.

14. The apparatus of claim 11, wherein the processor-executable instructions, when executed by the processor, are further configured to:

in a case where one data storage period ends, count a video data amount and a number of I-frame-group received by the terminal device in the data storage period and calculate an average data amount of the I-frame-group video data based on the video data amount and the number of the I-frame-group acquired by counting; and adjust a space capacity of the first cache space and a space capacity of the second cache space based on the average data amount of the I-frame-group video data to enable that an average data amount of at least one piece of the I-frame-group video data is able to be written into each of the first cache space and the second cache space.

15. A terminal device, comprising a processor and a memory, wherein the memory is configured to store a computer program, when executed by the processor, implements the method of claim 1.

16. A non-transitory computer-readable storage medium configured to store a computer program, wherein when executed by the processor, the computer program implements the method of claim 1.

* * * * *